(12) United States Patent
Gottstein et al.

(10) Patent No.: US 11,556,911 B2
(45) Date of Patent: Jan. 17, 2023

(54) SYSTEMS AND METHODS FOR AUTOMATED EQUIPMENT RENTAL

(71) Applicant: NeoCaddie Inc., Nashville, TN (US)

(72) Inventors: Tyler Gordon Gottstein, Lake Forest, CA (US); Michael Johnson, Spokane, WA (US); David Felker, Escondido, CA (US)

(73) Assignee: NeoCaddie Inc., Nashville, TN (US)

( * ) Notice: Subject to any disclaimer, the term of this patent is extended or adjusted under 35 U.S.C. 154(b) by 20 days.

(21) Appl. No.: 15/644,718

(22) Filed: Jul. 7, 2017

(65) Prior Publication Data
US 2018/0018650 A1    Jan. 18, 2018

Related U.S. Application Data

(60) Provisional application No. 62/362,418, filed on Jul. 14, 2016.

(51) Int. Cl.
*G06Q 20/18*     (2012.01)
*G06Q 20/20*     (2012.01)
(Continued)

(52) U.S. Cl.
CPC ............... *G06Q 20/18* (2013.01); *G01P 3/00* (2013.01); *G01P 13/00* (2013.01); *G06Q 20/20* (2013.01);
(Continued)

(58) Field of Classification Search
CPC ..... G06Q 20/18; G06Q 20/20; G06Q 30/0645
(Continued)

(56) References Cited

U.S. PATENT DOCUMENTS

| 4,803,348 A | 2/1989 | Lohrey et al. |
| 5,607,053 A * | 3/1997 | Sumiyoshi ............. A63B 55/40 206/315.2 |

(Continued)

FOREIGN PATENT DOCUMENTS

| BR | 102014012704 A2 * | 12/2015 |
| JP | 4939812 B2 * | 5/2012 |
| KR | 1020100058829 | 6/2010 |

OTHER PUBLICATIONS

"Food Recognition Technology," SRI International, printed Jan. 18, 2018, in 4 pages. URL: https://www.sri.com/engage/products-solutions/food-recognition-technology.
(Continued)

*Primary Examiner* — Luna Champagne
(74) *Attorney, Agent, or Firm* — Procopio, Cory, Hargreaves & Savitch LLP

(57) ABSTRACT

An equipment rental system comprising a kiosk, the kiosk comprising a user interface configured to receive user input and provide outputs to a user, a processor configured to receive the user input from the user interface, generate user output and control a locker system; and a locker system configured to store the equipment and allow access to the equipment under control of the processor, the processor configured to: receive log in and credential information form a user via the user interface, present the user a choice of equipment, receive a selection of equipment through the user interface, gather payment information from the user through the user interface, wherein the payment information corresponds to a period of use for the selected equipment, and control the locker system to make the selected equipment available to the user.

23 Claims, 5 Drawing Sheets

(51) Int. Cl.
| | |
|---|---|
| *G06Q 30/06* | (2012.01) |
| *G07F 9/02* | (2006.01) |
| *G06Q 30/02* | (2012.01) |
| *G07F 17/00* | (2006.01) |
| *G07F 17/40* | (2006.01) |
| *G07C 9/32* | (2020.01) |
| *G07C 9/27* | (2020.01) |
| *G01P 3/00* | (2006.01) |
| *G01P 13/00* | (2006.01) |
| *A63B 55/00* | (2015.01) |
| *G06Q 10/02* | (2012.01) |
| *G07C 9/38* | (2020.01) |

(52) U.S. Cl.
CPC ..... *G06Q 30/0201* (2013.01); *G06Q 30/0203* (2013.01); *G06Q 30/0241* (2013.01); *G06Q 30/0645* (2013.01); *G07C 9/27* (2020.01); *G07C 9/32* (2020.01); *G07F 9/026* (2013.01); *G07F 17/0042* (2013.01); *G07F 17/40* (2013.01); *G06Q 10/02* (2013.01); *G06Q 20/209* (2013.01); *G07C 9/38* (2020.01)

(58) Field of Classification Search
USPC .......................................................... 705/18
See application file for complete search history.

(56) References Cited

U.S. PATENT DOCUMENTS

| | | | | |
|---|---|---|---|---|
| 6,205,823 | B1* | 3/2001 | Volk, Sr. | A63B 55/00 70/58 |
| 6,885,998 | B1* | 4/2005 | Arduino | G06Q 10/02 705/14.39 |
| 7,444,296 | B1* | 10/2008 | Barber | G06Q 10/087 194/205 |
| 7,787,987 | B2 | 8/2010 | Kuehnrich et al. | |
| 2003/0008731 | A1* | 1/2003 | Anderson | A63B 24/0003 473/407 |
| 2003/0120509 | A1* | 6/2003 | Bruch | G06Q 10/10 705/307 |
| 2003/0120936 | A1 | 6/2003 | Farris et al. | |
| 2003/0191709 | A1 | 10/2003 | Elston et al. | |
| 2005/0179349 | A1 | 8/2005 | Booth et al. | |
| 2006/0166757 | A1* | 7/2006 | Butler | A63B 53/04 473/334 |
| 2008/0218343 | A1* | 9/2008 | Lee | A63B 55/00 340/568.6 |
| 2010/0056305 | A1* | 3/2010 | Hebert | A63B 47/00 473/409 |
| 2011/0060456 | A1 | 3/2011 | Lowe et al. | |
| 2012/0046786 | A1 | 2/2012 | Kuehnrich et al. | |
| 2013/0046753 | A1 | 2/2013 | Bowers et al. | |
| 2013/0080223 | A1 | 3/2013 | Lavu et al. | |
| 2013/0131863 | A1 | 5/2013 | Hoersten et al. | |
| 2013/0254123 | A1 | 9/2013 | Mullin et al. | |
| 2013/0332271 | A1 | 12/2013 | Hay | |
| 2014/0333664 | A1 | 11/2014 | Williams et al. | |
| 2015/0105901 | A1 | 4/2015 | Joshi et al. | |
| 2016/0035166 | A1 | 2/2016 | Amdahl et al. | |
| 2016/0099590 | A1* | 4/2016 | Velderman | H02J 7/0027 320/113 |
| 2016/0296810 | A1* | 10/2016 | Mandel | H04B 5/0025 |
| 2016/0364709 | A1* | 12/2016 | Kambhampaty | G06Q 20/18 |
| 2017/0330274 | A1* | 11/2017 | Conant, II | G06F 16/9537 |

OTHER PUBLICATIONS

"The Future is Automated," Modern Luxury, Rebecca Flint Marx, printed Jan. 17, 2017, in 2 pages. URL:https://www.modernluxury.com/san-francisco/story/the-future-automated.
"About Redbox," Redbox Automated Retail, LLC, printed Jan. 18, 2018, in 6 pages. URL: http://about.redbox.com/about-redbox/.
"How It Works," ecoATM, printed Jan. 18, 2018, in 2 pages. URL: https://ecoatm.com/how-it-works/.
"Mini, Compact, High-Tech Vending Machines," Vengo Labs, printed Jan. 18, 2018, in 16 pages. URL: https://vengolabs.com/.
"Buy Used Cars Online & Skip The Dealership/How It Works," Carvana, printed Jan. 18, 2018, in 4 pages. URL: https://www.carvana.com/.
"Amazon Go: Frequently Asked questions," Amazon.com, Inc., printed Jan. 18, 2018, in 3 pages. URL: https://www.amazon.com/b?node=16008589011.
"Bodega (company)," Wikipedia.com, printed Jan. 18, 2018, in 2 pages. URL: https://en.wikipedia.org/wiki/Bodega_(company).
"Parcel Lockers and Delivery Management Systems That Save Office Staff Time and Money," Parcel Pending, printed Jan. 18, 2018, in 3 pages. URL:https://parcelpending.com/.
"The Visual Search SDK," Slyce, printed Jan. 18, 2018, in 4 pages. URL: http://slyce.it/product/.
"Introducing Automatic Object Detection To Visual Search," Pinterest Engineering, Dmitry Kislyuk, printed Jan. 18, 2018, in 7 pages. URL: https://medium.com/@Pinterest_Engineering/introducing-automatic-object-detection-to-visual-search-e57c29191c30.
"Google Object Recognition: Google's Latest Object Recognition Tech Can Spot Everything In Your Livingroom," engadget.com, Jon Fingas, printed Jan. 18, 2018, in 2 pages. URL:https://www.engadget.com/2014/09/08/google-details-object-recognition-tech/.
"Object Recognition Technology," Arcsoft, Inc., printed Jan. 18, 2018, in 2 pages. URL: http://www.arcsoft.com/technology/object-recognition.html.
"The face recognition company," Cognitec, printed Jan. 18, 2018, in 6 pages. URL: https://www.cognitec.com.
"D-Tech RFID Technolgoy," D-Tech, printed Jan. 18, 2018, in 6 pages. URL: http://d-techinternational.com/us/technologies/rfid/.
"Retrievable Golf Ball," Chp-ing AG, printed Jan. 18, 2018, in 6 pages. URL: http://chip-ing.com/.
"Shot Genius: Improve Your Game With The World's First GPS Golf Ball," Hardsoft Co., printed Jan. 18, 2018, in 7 pages. URL: http://kevingangi.com/winter-project/.
"RF-Golf—The Ultimate Golf Ball Finder," RF-Golf.com, printed Jan. 18, 2018, in 1 page. URL: http://www.rf-golf.com/home.htm.
"Golf Gadget Review!—Prazza Golf Ball Finder", MyGolfSpy.com, GolfSpy_Dave, printed Jan. 18, 2018, in 11 pages. URL: https://mygolfspy.com/prazza-golf-ball-finder-review/.
International Search Report and Written Opinion dated Oct. 24, 2017 for corresponding PCT Application PCT/US2017/042255 filed Jul. 14, 2017.

* cited by examiner

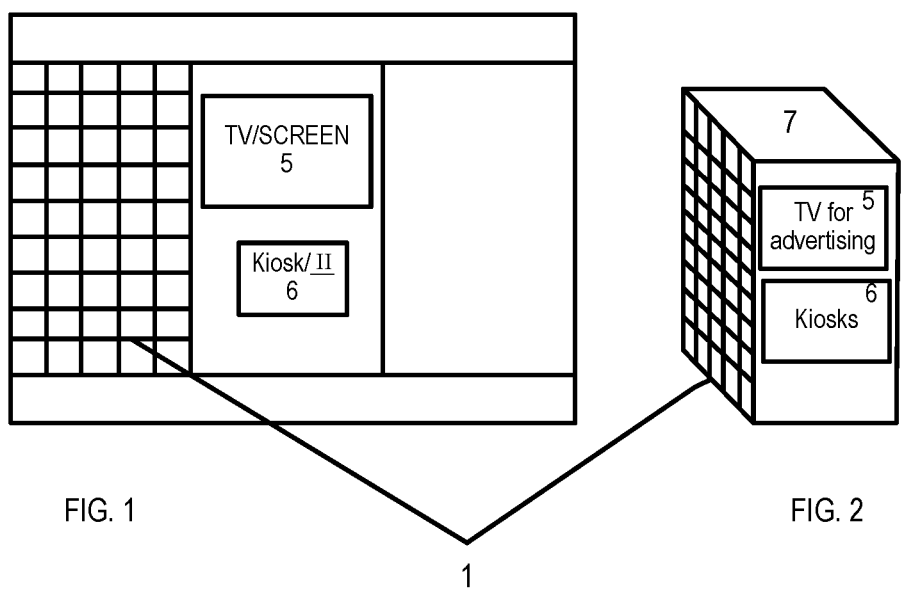

SYSTEMS AND METHODS FOR AUTOMATED EQUIPMENT RENTAL

RELATED APPLICATION INFORMATION

This present application claims the benefit of priority under 35 U.S.C. 119(e) to Provisional Patent Application Ser. No. 62/362,418 filed on Jul. 14, 2016 incorporated herein in its entirety as if set forth in full.

BACKGROUND

1. Technical Field

The embodiments described herein are related to equipment rentals and purchases and in particular to systems and methods for fully automated equipment rental and purchase.

2. Related Art

The conventional process for equipment rental involves the consumer going to a physical store location and engaging in what can often be a time consuming process to pick out equipment and finalize the rental agreement. For example, ski rentals and purchases require the consumer to either head to store ahead of time, pick out the equipment, try it on, and then finalize the paper work and payment, or do so at the resort. Golf equipment rentals and purchases again require the user to go to a store or to a course, pick out equipment, test the equipment to determine what is best for the golfer, and finalize the rental or purchase agreement. Hitting balls into a net in an store is not a realistic way to evaluate one golf club versus others. The best place to test & compare new or used golf clubs is on the golf course where the golfer can see the entire flight and roll out of the ball for a variety of golf shots. Unfortunately, most golf courses no longer sell golf clubs and their rental clubs, if they have any at all, are generally a poor selection of older used models, not the selection a golfer would want to evaluate when making a new club purchase decision. Furthermore, golfers interested in making a new or used club purchase decision want to test new or used clubs and compare several brands against their own club in a real golf setting in order to make an informed purchase decision. new and used club pricing on the internet is often lower than in retail establishments and it is easier to shop for prices on the internet than going store to store—our kiosk will offer "internet pricing" because we will monitor internet pricing and meet or beat it if we desire. Points to include: As a result, renting or purchasing equipment at a retail store location, such as sports equipment, can be an inconvenient, difficult and time consuming process.

According to the National Golf Foundation in 2015 total golf club sales in the US was $4.8B, with approximately $0.8B in used drivers/putters/wedges and $2.3B in new driver/putter/wedges. There are currently approximately 23.8M active golfers. In 2016 there were 2.6M first-time golfers, the largest number since 2000. The group called the "committed golfers" represents 95% of all golf participation and spending and this group totaled 20.1M golfers, a 3% rise over 2014.

The golf market has changed over the years. There was a time when most golf clubs were sold at golf courses in the pro shop. Because of several factors, including the advent of golf launch monitors that can estimate the total flight and distance of a ball when the ball is simply hit into a net, the majority of golf clubs are now sold in large sporting goods stores, such as the national retail chain Dick's Sporting Goods. These retailers have hitting bays and launch monitors. The majority of golf courses do not sell golf clubs anymore because they can no longer effectively compete with the large sporting goods stores largely because of the buying power of the large retailers. However, prior to making a golf club purchase decision, golfers would prefer to test clubs on the course or driving range under normal golf conditions as opposed to testing the clubs in a store, hitting a ball into a net.

Various websites offer the best opportunities to purchase clubs at the lowest prices. But the major drawback of buying a golf club from an online store is that the golfer does not have a chance to test the club before making the purchase. Furthermore, most online retailers charge shipping costs and do not allow money back returns, they only allow credit towards the purchase of another club. Also, there is an inherent risk that when purchasing online the product is counterfeit or poor quality. Despite these drawbacks, many golfers still purchase golf clubs and accessories via the internet because of the much better pricing compared to purchasing at brick & mortar locations. In recent years, OEMs have invested heavily into their own direct to consumer channels, taking more control of the sales process. This has had an impact on the golf equipment market.

Top golf brand driver clubs, for example—those made by Callaway, Ping and Taylor Made, are among the most popular brands with golfers and these clubs generally range in price from $399-499. Purchasing a new driver is not a decision that is taken lightly by the golfer. In making a purchase decision, golfers often want to compare the performance of their current driver to several new top brand drivers to see which provides the best feel, distance and desired ball flight. Feel and improved performance are the leading factors that drive golf equipment sales. For this reason, a common practice of golfers is to test multiple drivers in a brick & mortar retail store to determine which driver appears to provide the best performance according to the launch monitor data, and then they return home, check the internet for the best pricing on the driver they want and purchase the desired driver at the lowest price online. This practice enables a golfer to purchase the exact driver he/she wants at the lowest price possible, but the golfer's club selection was based on testing the clubs in the artificial golf environment of the retail store, understanding and relying upon the output of the launch monitor to determine which club will potentially work best on the golf course. Most golfers agree that they would rather hit the drivers or other clubs in a realistic setting, such as a golf course or driving range, in order to determine which club is best for them.

SUMMARY

According to one aspect, an equipment rental system comprising a kiosk, the kiosk comprising a user interface configured to receive user input and provide outputs to a user, a processor configured to receive the user input from the user interface, generate user output and control a locker system; and a locker system configured to store the equipment and allow access to the equipment under control of the processor, the processor configured to: receive log in and credential information form a user via the user interface, present the user a choice of equipment, receive a selection of equipment through the user interface, gather payment information from the user through the user interface, wherein the payment information corresponds to a period of use for the selected equipment, and control the locker system to make the selected equipment available to the user.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 1 and 2 illustrate a smart kiosks system configured in accordance with one example embodiment;

DETAILED DESCRIPTION

Figure 3:
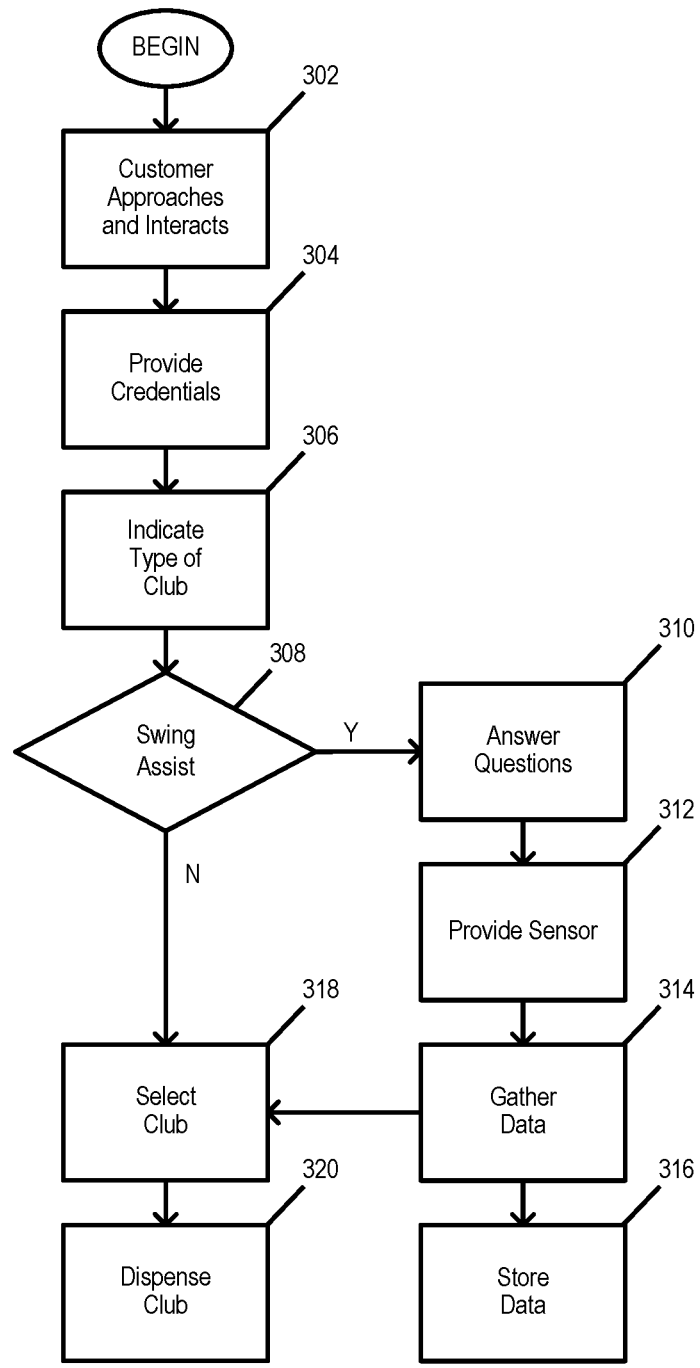
FIG. 3 is a diagram illustrating an example process for accessing equipment using the kiosk of FIGS. 1 and 2 in accordance with an example embodiment.

The embodiments described herein relate to the rental and sale of articles through a kiosk that is fully automated, is not physically attended by any person, is connected to the internet and is part of a system that includes a network of kiosks, a website, mobile app, one or more product warehouses and one or more monitoring locations. While certain aspects of the various systems and methods are described in the embodiments below, it will be understood that other aspects may not be described or not described in detail. The descriptions below should not be seen as limiting the extent of any of the embodiments to only those things described as well-known components or aspects may be omitted.

Many of the embodiments described here relate to the sale or rental of golf equipment through a system termed the "NeoCaddie". But it will be understood that golf equipment is just one example of the equipment that can be accessed through the systems and methods described herein. For example, skis, textbooks, wakeboard, snowboards, surfboards and many other items could be dispensed with this technology.

With respect to golf equipment, the systems and methods described herein provide substantial benefits to at least five distinct consumer segments: 1) those golfers who go to the golf courses and driving ranges on a regular basis, 2) the millions of golfers who would otherwise go to a brick & mortar golf store to test clubs before making a purchase decision, 3) consumers who have access to the Internet and the present invention's dedicated website for easy selection and reservation of golf clubs and accessories, 4) golfers who are on vacation, do not have their clubs with them and desire to rent a club and 5) those golfers who are directed to the kiosk by a third party such as a golf manufacturer or golf instructor. For all of these consumers the rental and/or purchase experience can then be concluded by picking up and dropping off golf clubs and accessories at a kiosk at the golf course, driving range or other golf-related location in their local vicinity.

In certain embodiments, a system for providing the above benefits can comprise a kiosk that comprises a locker system and various under interfaces. For example, FIGS. 1 and 2 illustrate a smart kiosks system 7 configured in accordance with one example embodiment. Such a kiosk system 7 can comprise a locker system 1 as well as two monitors 5 and 6.

Kiosk 7 can be configured to provide the best purchase experience—allowing golfers to test and compare various clubs at an outdoor driving range or on a golf course during normal play and then to purchase the desired club at a price that is competitive to the best pricing available on the internet or at any retail store. The foregoing indicates there is tremendous market potential for enabling golfers to rent and purchase golf clubs through a kiosk 7 at a golf course or driving range.

The kiosk 7 functions not only as a golf club and accessory rental and sales platform, but also as a promotional platform of the golf club manufacturers and for other advertisers who are interested in addressing the active golfer market. The golf OEMs will also be able to direct their own customers to the kiosk 7 in order to test their clubs. This could be an effective way for OEMs to accomplish a product launch. The kiosk 7 provides a platform for educating golfers on golf equipment.

As a golfer approaches the kiosk, the golfer observes the display monitors 5 and 6 and any other user interface components. The golfer can then enter the appropriate commands at the user interface control system associated with kiosk 7 to select a club or accessory to be dispensed by the kiosk 7. The user interface control system can employ simple menus, decision algorithms and a fixed set of keys for golfers to make their selections.

For example, as illustrated in FIG. 3, a customer approaches machine 7 and begins interaction with touchscreen 6 in step 302. The customer can, in step 304 be required to log in and provide some form of credential such as a password, PIN, biometric, e.g., a fingerprint scanner can be included in kiosk 7, or scan some form of credential stored on or available via a mobile device. In step 306, the customer can be asked what type of club he is looking for and can be presented with results for that type of club.

In step 308, the customer is presented with a choice to either select a club, or to use Swing Assist technology. If swing assist is selected the system asks a few questions about the golfer in step 310 and a sensor can be provided in step 312 that is configured to determine swing to plane, swing speed and perfect loft and lie in step 314. Analytics of swing is saved to customer's profile for future use in step 316.

An updated set of golf club options can then be presented to the customer and the user can select the desired club or clubs in step 318. Once payment information is handled, the club can be dispensed in step 318. The system is configured such that only the correct door opens to allow the customer to remove the correct club.

Payment and gathering payment can comprise various steps. For example, if the user is simply purchasing the club(s), then their account or payment information can be obtained and verified and the payment can be completed; however, the full value of kiosk 7 is realized when the user is able to take the club and demo it for a period of time. Thus, gathering payment information can also include arranging the period of time for the demo, paying for the demo, and also maintaining the payment information to ensure that the club is returned at the appropriate time. The time can, e.g., be a few hours or a few days.

Figure 4:
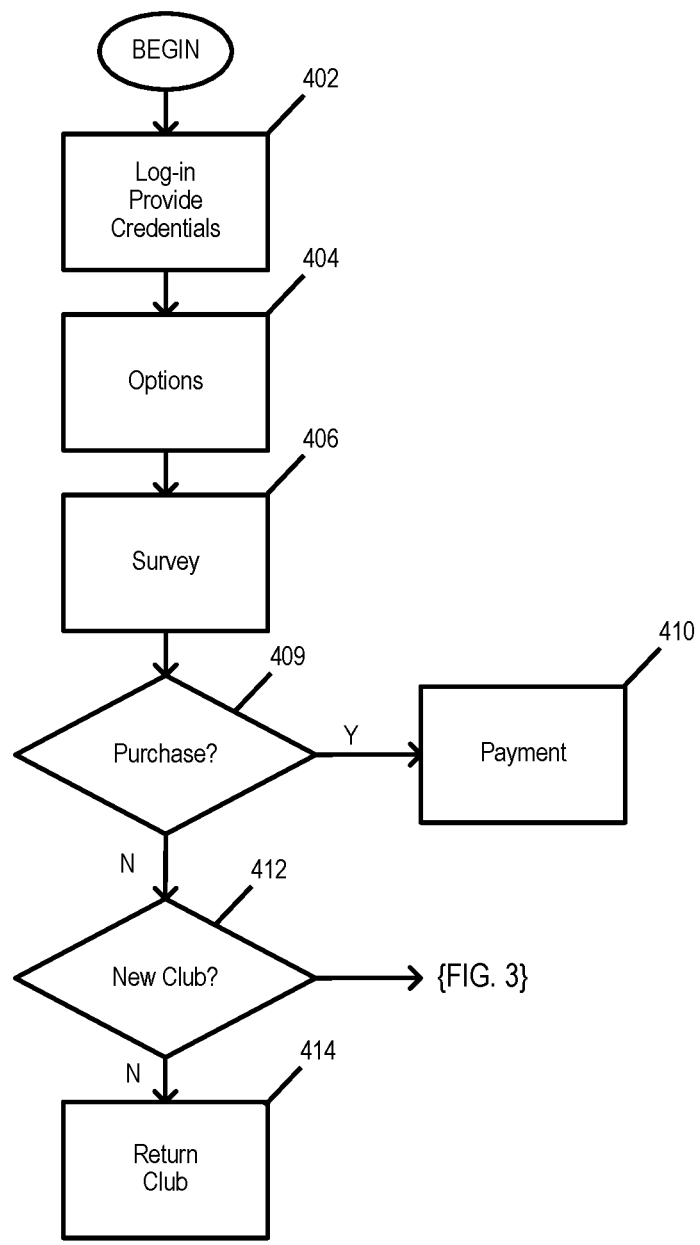
FIG. 4 is a diagram illustrating an example process for returning equipment using the kiosk of FIGS. 1 and 2 in accordance with an example embodiment.

As illustrated in FIG. 4, upon return, the customer can again be required to log in and provide their credentials in step 402. The customer can then, in step 404, be presented with a series of options such as offers to keep the demoed club for X price, a chance to purchase a new club, or an offer to demo a different club. In addition, in step 406, survey questions can be presented to the user about performance of the club, which can be used to make recommendations to future users.

If the user determines to purchase a club in step 408, then payment can be processed in step 410. If the user determines to demo a different club, then the relevant step of FIG. 3 can be repeated for that club. It should be noted that the system can be configure in this case to make recommendations based on information in the user profile and responses to surveys from other users as well as form the user, among other information. Otherwise, the user can be prompted to return the club to locker in step 414. The customer can receive a confirmation the item was returned in step 414. The kiosk 7, and the controlling software in combination with sensors on the club, can be configured to ensure that only the correct club can be returned.

Figure 5:
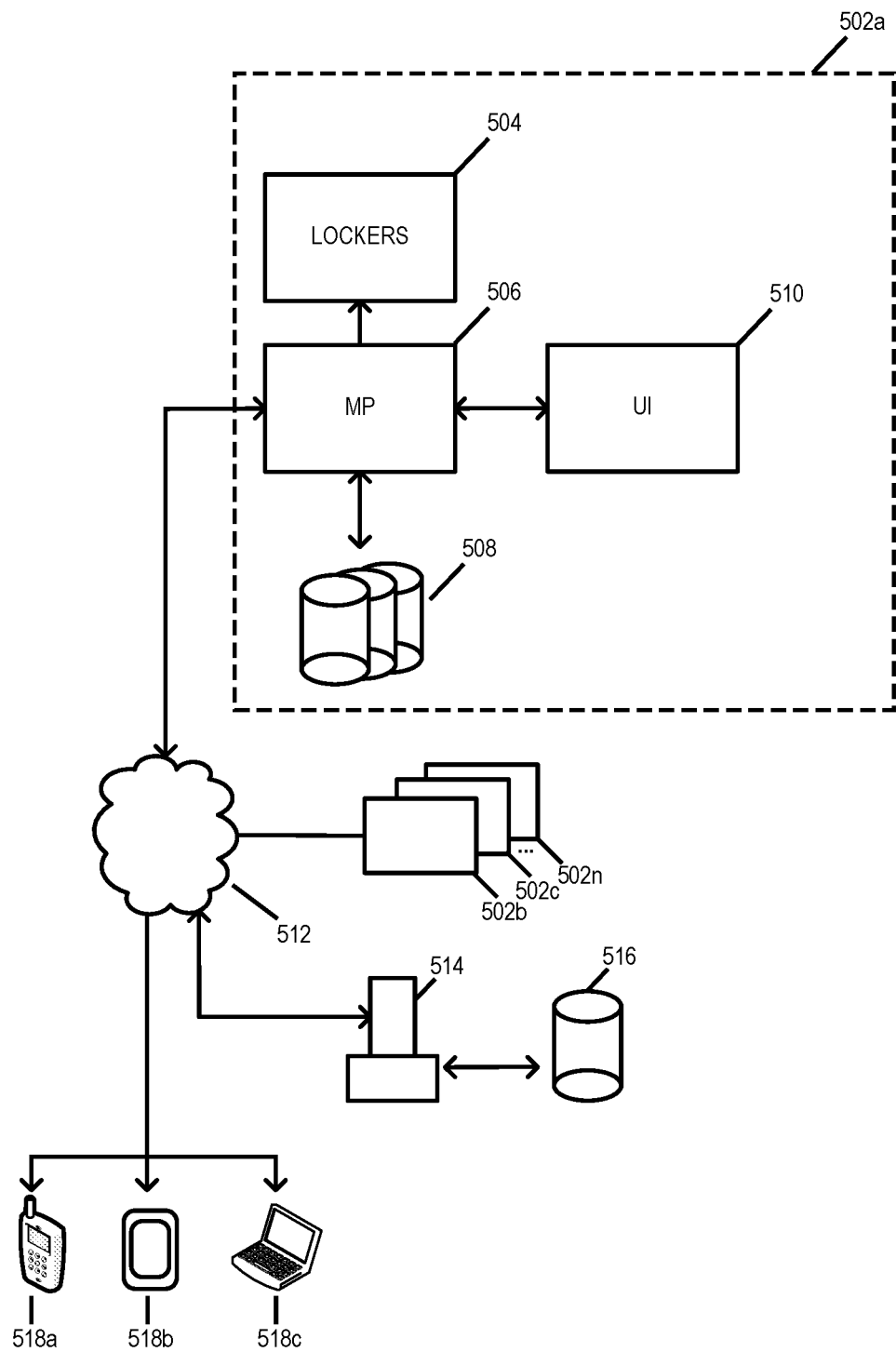
FIG. 5 is a diagram illustrating an example equipment rental system in accordance with one embodiment.

FIG. 5 is a diagram illustrating an example equipment rental system in accordance with one example embodiment. As can be seen, system 500 comprises a kiosk 502a that comprises a processor system 506 for controlling the operation of the kiosk 502a. Kiosk 502a can also comprises storage 508 for storing code, e.g., in the form of applications that the processor implements to control the operation of kiosk 502a.

Kiosk 502 a can also comprise a user interface 510 for facilitating user interaction. User interface 510 can comprise displays, keypads, touchscreens, biometric scanners, cameras, magstripe readers, etc., the use of at least some of which is described herein.

Kiosk 502a can also comprise networking capability that allows kiosk 502a to interface through network 512 with other kiosks 502a, 502b, . . . , 502n as well as one or more central servers 514. Central server 514 can be interfaced with further storage 516. Interaction with other kiosks and central servers is described herein.

In addition, users can in certain embodiments, access kiosks 502 or central server 514 via remote devices 518 running certain applications as described below.

It should be noted that in certain embodiments, a customer can purchase a club online and can pick up the club at the kiosk located nearby.

The golfer can use a variety of methods to pay for rental and/or purchase of golf clubs and golf accessories, and will be able to do so through the website, mobile app, or kiosk 7. These payment methods will include but not be limited to credit & debit card, electronic credit associated with the person's account or an electronic card or special code that is purchased in exchange for currency or credit card. With the appropriate hardware, the kiosk 7 can be setup to accept currency; however, it is anticipated that this will not be the preferred payment method.

The kiosk 7, website and mobile app can be configured to automatically produce and deliver a printed or electronic receipt to consumers renting or purchasing golf clubs or accessories from a kiosk 7. The electronic receipt can be sent to computer file, texted to a mobile device, or emailed to a user's email account.

When customers rent and return products, the kiosk 7 can take one or more pictures of the product from one or more angles when the product is rented and as it is returned so as to verify the identity of the product and/or to gauge any damage or change in the item over the course of use. The pictures can also be used to specify the condition of the product prior to the next rental. The clubs and accessories can also or otherwise be fitted with different labels, stickers, chips or devices that enable the item to be positively identified. This is important to enable the inventory of the kiosk 7 to be tracked in real time, as well as to ensure the security of the clubs and accessories from theft.

Thus, each kiosk 7 can be a "smart machine", controlled by a computer and software and with an internet connection such that it can, e.g., be connected to a network of kiosks 7. The kiosk 7 can perform information gathering and dissemination through the internet, can coordinate the user experience via the system website/mobile app, and can permit the system administrator to manage all of its operations from a central or multiple locations.

In certain embodiments, the system permits coordinated roll-out of promotional and advertising programs across all or select kiosks, real-time feedback from each kiosk as to its use and functionality, and can coordinate product exposure and testing for national golf product introductions and related promotional programs across all or select kiosks.

The kiosk 7 is designed and built with such materials that it will be strong enough to prevent theft, such as tampering with unopened lockers. The lockers can have transparent doors that are designed to allow users to see the item they are contemplating renting or purchasing. The lockers can also be illuminated from the inside to further enable golfer to see the contents of the unopened lockers. Kiosks 7 located outdoors are designed to withstand all weather conditions. The kiosk's weatherproof design may include a cover or shelter of sorts to protect the kiosk from sun, wind, rain and snow. The kiosk may or may not incorporate additional design features on its exterior for the purpose of advertising or brand representation.

The kiosk 7 can be a modular design, built with the intention to add or change out sections, depending on the needs at a specific location. Kiosk components can include:

Flat screen monitors to deliver advertising, instructional information, etc.

Touch screen monitor as a user interface. A separate stand-alone keyboard may or may not be incorporated with the kiosk.

Main console that consists of the above items plus a computer, files storage hardware, and detectors, transmitters & antennae appropriate for the associated technology for tracking clubs and accessories.

Cameras and lights for documenting activities and the make, model & condition of products before and after rental activities.

Lockers or distribution points to receiving and returning products.

Kiosks 7 can be configured to store up to several hundred golf clubs or more, making it very competitive with regards to real estate and building costs associated with the brick & mortar golf retailer competitors.

The kiosk 7 can be connected to and accessible through the internet from a central location or from multiple locations. This enables a remote actor to perform such functions as changing advertising and educational materials, adjusting pricing for each product, determining inventory level, determining the rental & purchase frequency for each product, etc. The kiosk 7 can be configured to collect all pertinent data and information from customers, storing it on the computer hard drive or in another location such as an external hard drive or in the cloud. All of the gathered information can then also be accessible through the internet or at the kiosk 7 location through the computer and/or hard drive.

The kiosks 7 can be fully automated integrated golf club and accessory rental and/or purchase systems that incorporate robust, secure, scalable software that can provide a personalized experience to customers, as well as real-time feedback to central & hosting locations, service representatives, maintenance representatives and advertisers. The kiosk 7 can also incorporate scalable hardware that leverages existing technologies such as touch screens, focused audio speakers, video monitors, and technology utilizing the Internet through a system website and/or mobile phone application.

The kiosk's user-friendly control interface could resemble the interface conventionally used on an automated teller machine, having a graphical user interface with touch screen interface control capability. In addition, in certain embodiments, two or more control interfaces can be incorporated into one kiosk location such as by being positioned on each side panel of the kiosk 7, so that multiple people can interact with the kiosk 7 at once. Additionally a user's mobile phone or other mobile device can, in certain embodiments, be connect to the kiosk 7 via Bluetooth technology or via an internet interface, acting as the control interface between the customer and the kiosk.

For example, in certain embodiments, there is a front and back monitor and customer interface—such that two people can use the kiosk at once. In this type design it is advantageous to also have two dispensing areas and two return areas (dispensing and return areas could be the same location). In this multi-user design it is also advantageous to configure the product lockers in such a way as to minimize the volume required by a golf club. This can be done a number of ways, including by having the end of the storage locker facing the customer be large enough to enclose a golf club head, but that the rest of the locker is only large enough to hold the length of the golf shaft. This non-uniform locker size can also be constructed with tubes to hold the shafts and the golf club head could be located in a larger diameter tube. This design only allows golf clubs to be pulled out of the kiosk in just direction.

A number of alternative kiosk design feature can also be included, such as:

Multiple touch screens or just one large touch screen that was large enough to display all of the educational materials, advertising and other user information.

Golf club cleaning technology.

Wireless charging ports for electronics.

Wireless hotspot.

Custom swing fitting technologies.

Customer ID and security features, including fingerprint scanner, point of purchase credit card reader, various cameras and an alarm system.

External speakers and microphone, that could be used for multiple purposes including 2-way communication with a remote customer service person who could then see and hear the person and see products.

Custom Rotary internal works for dispensing and receiving products through a single door.

Appropriate design and hardware so that the kiosk could not be moved unintentionally or stolen, but could be moved when necessary to an entirely different location.

In certain embodiments, the kiosk 7 can be connected to the internet and can be capable of transmitting data in real time to accomplish many purposes, including but not limited to: keeping personnel updated on rental data, sales data, inventory levels, maintenance issues, all information input by golfers and all information about each kiosk's inventory, rental & sales records, etc.

The network capability can allow all information to be transmitted to a central location or to cloud storage, so that the information can be accessed effectively and efficiently in making decisions about customer service, restocking inventory, kiosk maintenance, etc. The kiosks will be addressable from one or more remote locations in order to perform a wide range of activities, including but not limited to—changing product pricing, advertisements, fitting algorithms, product information, etc.

In certain embodiments, each kiosk 7 can be fully networked with 1) all other kiosks, 2) the inventory control or supply warehouse data system, 3) the system website and mobile phone app. This interconnection of everything can occur via the internet or satellite links at each hosting location. Through this linked network, the rental experience for each consumer can be customized based on a profile for each consumer, regardless of the location the customer decides to frequent, such as via personalized home pages and rental screens. In addition, the rental and purchase experience can be customized for each kiosk and golf course or driving range location with its own products, pricing, advertising and other adjustable features.

The kiosk can also be designed to recognize the customer through GPS location ping, cell phone ping, customer code or any other technology. This will enable the kiosk to more personalize and streamline its interaction with each customer. This feature will also enable the customer to rent or purchase one or more golf clubs or accessories directly from the kiosk as well as indirectly by making a rental reservation through the website or mobile app for later pickup at a conveniently located kiosk.

In certain embodiments, the system can be configured to provide for automatic query of 1) the rental & purchase patterns on a per machine basis, 2) the survey answers provided by customers and 3) the OEM product and advertising activities in order to make predictions about the future product selection and necessary inventory movement needs by kiosk7, geo-region and demographic region. This helps optimize the inventory at each location with respect to rental and sales and make the inventory movement and restocking processes more efficient and accurate. Electronic records can also be transmitted to the kiosks indicating the new inventory to be delivered to the kiosk 7 and the when the new inventory is loaded into the kiosk 7.

The golf clubs and accessories can be stored securely inside the kiosk in several ways:

1. Lockers system with locker doors that open at the proper time to allow customers to retrieve or deposit products.

2. A carousel system where there are minimal lockers or openings in the kiosk and the products move about the interior or the kiosk in a carousel system of sorts.

3 Product assembly system where the pieces of golf equipment (usually club head and shaft) are not assembled until the customer has completely specified the product in terms of head type, head loft, shaft type, shaft flex, shaft length and other adjustable parameters. The kiosk 7 can then automatically select the right combination of equipment pieces and assemble them into the proper configuration. In this design the golf club heads and golf shafts can be stored inside the kiosk 7 in different locations within the kiosk 7. The kiosk 7 can use a torque wrench devise to attach the club head and the shaft. The kiosk 7 can build the club combining the correct shaft with the correct head and loft and fade/draw settings and then deliver it to the waiting customer.

The kiosk 7 can be is built with capabilities to withstand all weather conditions, which means it can have a cooling system that keeps the kiosk 7, its products and it's electronic hardware sufficiently cool. The kiosk 7 can also have a heating system that protects from cold conditions.

For security reasons, the kiosk 7 can be bolted to the ground and its lockers or product dispensing areas cannot be opened manually. Further, in certain embodiments, the kiosk 7 can include, as noted above a fingerprint scanner, a scanner for scanning a driver's license or other ID, or a magnetic stripe or chip reader.

Kiosk 7 can be configured with a modular attachment that distributes golf balls one at a time as well as imaging devices, such as cameras as noted above to recognize product, faces, usage and for security, etc.

The kiosk 7 can also incorporate a slot loading DVD drive that permits video related to a desired advertisement or technical content to be read from DVD at the kiosk location. The content read from the DVD can be stored on the hard drive associated with the kiosk 7 and can be accessed, played and presented on the associated video display monitor or touchscreen, as desired. Alternatively, the information that is downloaded from a DVD could also be downloaded to the kiosk's hard drive via an internet connection, a USB flash drive or other types of file storage and transfer technologies.

The lockers can have load cells in each locker that determine the exact club's weight and can thus be used to determine if the proper club was not returned to the kiosk. This technology can be used in combination with other camera or sensor technology to make sure the proper club is rented and returned.

In certain embodiments, the kiosk control software, or software at a central location can include an algorithm that properly matches the price of the club based on the number of times it has been demoed. The kiosk 7 can also be configured with an algorithm to detect certain key strokes that indicate the customer is having an issue using some kiosk functionality. When the kiosk 7 detected such an issue a message can be displayed to suggest a solution to the perceived problem. Also, the touch screen and/or video monitor can be configured to operate in 2-way audio/video mode for interacting with customer service. Thus, a customer service chat function could also be employed to help customers resolve issues with the help of a customer service person.

Other Kiosk functionality that can be built into the kiosk with hardware and/or software:
- Kiosk dispenses Golf clubs, Golf Technology, Rangefinders, gps devices, audio speakers, cell phone chargers, Golf accessories, Cigars, alcohol, Ipads, training equipment, sunscreen, etc.
- Kiosk is connected through WIFI.
- People counter: the kiosk counts the number of people that walk past or approach the kiosk.
- Kiosk detects through a motion or infrared sensor when someone is in front of kiosk and this causes the kiosk to wake from sleep mode, if it were in sleep mode.
- Kiosk automatically goes into sleep mode at certain times and wakes from sleep mode at other set times or depending on certain events occurring.
- Kiosk is able to scan and examine clubs for damage, cleanliness and quality control.
- Kiosk contains a digital ad platform that loops multiple marketing videos on its video screen.
- Kiosk has the ability to accept old clubs for trade-ins and is able to issue funds toward a new club purchase from the kiosk.
- Kiosk has individual shafts and heads and can physically combine them for any customer order.
- Kiosk can physically adjust the loft and hook/slice parameters on a shaft.
- Kiosk can cleans clubs The software configured to work in conjunction with Kiosk 7 can include:
- Swing Assistance Algorithm that allows customers to match their golf skills and swing characteristics to a club that will best perform based on the individual's golf skills and swing characteristics.
- Algorithm suggests the correct items from the kiosk. Recommendations can be manually controlled to sell advertising.
- A Text message is automatically sent out to remind golfers to return clubs. A code is sent to allow for easy returns. Text messaging can be sent out to market and advertise.
- Algorithm to recommend multiple clubs be rented at a time so the customer can determine which is best for him or her.
- Allows for customers to log in on the home page to receive coupons and discounts.
- Allows customers to enter a promo code to receive a discount.
- Collects data on each user: Members click path and usage. Shows exactly what clubs were demoed by each member. Shows advertising viewed, time on kiosk, number of time used.
- Searches web and extracts the best price online and can automatically assigns prices to new and demo golf clubs and accessories.
- Automatically alerts the correct party when clubs are sold, when clubs need to be replaced or restocked, when there is a kiosk or software malfunction or any damage to the Kiosk.
- Allows for exchange of used clubs. Customer can return a previously purchased club for credit towards another demo or new golf club.
- Cell phone integrations with the kiosk—bluetooth connect to kiosk to know customer is approaching. Bluetooth could offer instructions, allow for interaction with kiosk, transmit information.
- Interactive with golfers post golf rounds to collect scores and track handicap, show highlights on the course from cameras set up out on course, share pictures with social media, email information to others.
- Has a feature for auto-filling customer information for a returning customer (issues a customer ID or askes for cell phone verification or password, etc).
- Various pricing features include:
- Clubs can be rented at prices between about $0.01-$25.00 each, or more, especially when more than one club is rented.
- Pricing is set automatically based on prices found online.
- Clubs are rented for specific periods of time.
- Advertising options include:
- Ads and educational materials can appear on the Touch Screen and/or the video monitors, as well as on the mobile app and website. Multiple screens can work together with customer interaction.
- Specific Advertising is played to customer based on past usage of the kiosk.
- Sell advertising per page. Each page has a sponsor.
- The last page, the confirmation page will offer deals at nearby restaurants and bars or offer some other appropriate deal based on the customer's location and other know attributes in the customer's profile.

In certain embodiments, kiosk 7 can include features that would allow a customer to clean the club or accessory prior to returning it to the kiosk locker. This can be a manual process performed by the customer or it can be automated to some degree up to being completely automated. HD camera technology can be used to determine if a club is cleaned to proper specifications before it is accepted back into the kiosk 7. If not, the user will have to re-clean the club before the transaction successfully finishes or could agree to pay a cleaning fee.

The kiosk 7 is designed to have low maintenance costs and minimum downtime. Some of the decisions to perform preventative or immediate maintenance on a kiosk 7 are made at a location remote from the kiosks through electronic notification by the kiosk 7. Other times the service representatives will identify issues at the kiosk 7 that will require maintenance efforts. The kiosk 7 will notify a central location if it detects any operational issues.

Since a kiosk 7 can be located indoors or outdoors, kiosk 7 should employ technologies that will make it difficult for a person to physically damage the kiosk 7 or to physically or electronically break into and steal from the kiosk 7. Thus, in certain embodiments, the kiosk 7 can include an alarm system to notify the central station, golf course and proper authorities when the kiosk 7 is being tampered with. Further, the alarm indication can be transmitted through the internet or other network connection. When a kiosk loses internet or network connectivity, it can first be assumed that there is a security issue and proper notifications will be made. The information system and profile on each kiosk 7 can be used to determine what preventative measures need to be taken depending on the kiosk's specific location.

Unlike brick-and-mortar stores, kiosk 7 does not require any on-site personnel to service the customer's needs. It is expensive to have qualified personnel in stores work with customers to determine the best club for the customer in terms of loft, shaft flex, make and model. The level of golf skills and degree of product knowledge typically varies widely among the store personnel. Thus, the club recommendation made by the store personnel to a customer is a function of the capability of the person who fitted the customer to the new club and made the recommendation. Also, the salesman might not have the customer's best interest in mind but instead just push their favorite clubs on to customers. Thus the inconsistencies, lack of knowledge or motivations on the part of the sales personnel can instill doubt in the minds of the golfers and can result in golfers either deciding not to make a purchase decision or not purchasing the best product for their individual golfing ability.

The kiosk 7 being located at indoor/outdoor driving range or golf course not only enables golfers to easily test golf products in realistic settings and see the actual flight of the golf ball, but in this setting a launch monitor can also be used to provide the golfer with even more information that can be used in making a well-informed club rental and/or purchase decision. Furthermore, the information from a launch monitor or instrumented club (measures and records club head speed at ball impact, club head angle of attack at impact, initial ball speed, ball spin, ball spin axis, ball launch angle, etc.) can be manually entered through the touchscreen of the kiosk or automatically transferred to the kiosk via technologies such as Bluetooth, wireless internet connections, etc. so that a computer algorithm imbedded in the kiosk's software can be used to make informed club selection recommendations to the golfer, which in the case of a driver club would be a recommended make and model driver along with a specific club loft and shaft flex.

The kiosk 7 can use an algorithm(s) to properly recommend the optimum club to customers. The fitting algorithm can be used on any part of the system—mobile app, website and kiosk. The fitting algorithm can ask a golfer several important questions to determine better individualized club fit. Depending on the golfer's answers the system determines the better club for the customer. The fitting data can be stored in the customer user's profile for future demos and purchases.

The kiosk 7 can contain clubs that have sensors located in or on the shaft and/or attached to the club head. These sensors can determine swing speed, swing path, predicted ball flight, face angle and many other performance parameters. This individual data can be transmitted to the kiosk 7 computer or mobile app or website and is then analyzed. The kiosk, website or app can then take the data and recreate the golfer's swing in 3D and can offer recommendations while fitting the customer to the correct club. The kiosk, mobile app and website can all offer recommendation to the customer based on the customer's individual swing data and golfing ability.

The kiosk can also connect to sensors installed on the driving range; sensors that indicate the flight path of a golf ball and report the results through the kiosk monitors. Thus the kiosk can augment the driving range experience by collecting and displaying a golfer's performance information and then to recommend a club that would best serve the golfer's needs based on the golfer's performance data. When a customer takes an instrumented club or clubs to the golf range, the sensors on the range determine swing speed swing path, predict ball flight and face angle. This technology creates an atmosphere where golfers have no restraints of sensors on each specific club but can use any club and receive swing data. The information is transported to the kiosk 7 and analyzed. The kiosk 7 can then make club selection recommendations that will help he golfer hit the ball longer and straighter.

The kiosk system can also use sensors in the balls to properly fit customers and collect information. Golfers can use specific instrumented golf balls on the course or range. The golf balls can have sensors inside each ball in order to track as a function of time their location, ball speed, flight trajectory, maximum height, ball spin, face angle of the club, type of club, projected swing speed, etc. The information is transmitted to the kiosk 7, e.g., via mobile app, competitor or directly to the kiosk, where it can be analyzed. The kiosk 7 can then make club selection recommendations that will help the golfer hit the ball longer and straighter.

If the customer chooses not to be fit to a club, he or she can still browse the catalogue of clubs, having access to any item in stock at that specific kiosk 7 or at other kiosk locations.

The systems and methods described herein can include a user-friendly website to facilitate the golf consumer experience and selection of golf equipment and accessories. The website can permit a consumer to answer a series of questions that then enable the fitting algorithm to recommend specific golf club parameters such as loft and shaft flex, to browse the features and benefits of new and older golf clubs and golf accessories, query make/model/loft/shaft flex clubs in stock for viewing or purchase, read reviews and recommendations from critics and other users, locate a kiosk based on inputting a preferred geographical area such as a particular zip code, enroll as a member, view technical information and promotions about the clubs, and accessories and view promotional advertisements.

"Members" are defined as golfers who have a profile in the kiosk/website/mobile app system and are repeat users of the system and are able to do many things including but not limited to all of the foregoing tasks, and are able to modify their preferences, alter or cancel their membership, and view special members-only promotions. Additionally, existing members can be greeted by a customized homepage that is personalized for each member based on their inputted golf abilities and current golf equipment. The website can be accessible from a variety of hardware units and in a variety of formats. For example, the website can be accessed from personal digital assistants, cell phones, tablets, desktop computers and personal computers. The mobile phone app is preferably accessible by most phone types (Apple, Android, etc).

It is important to determine when a customer has received an item from the kiosk 7 and then returned the exact same item to the kiosk 7. There are many different technologies that can be used to track when an item has been received from or returned to the kiosk 7 including but not limited to the following tracking and identification technologies:

Sensor-based technology;
High Definition Camera Technology; and
Barcode technology.

The kiosk 7 can be configured to use one or more of these technologies in combination to detect when an item has been received or returned by the customer.

Further, one or more high definition cameras can be used to visually recognize a specific club or accessory and determine whether the proper item has been delivered to the customer or returned from the customer.

In certain embodiments, the kiosk 7 can have a data set of images of each specific item to compare with items currently being delivered or returned. From this database of images the kiosk software can determine not only whether a specific item has been delivered or returned, but could also determine the state of wear, cleanliness or damage to the specific item over time. The images could also be used to determine the exact location of each item within the kiosk 7. The state of the item or location of the item within the kiosk 7 can be made using a single or multiple images of the item, and/or using one or more other tracking and identification technologies. Camera technology can be used in conjunction with barcode or technologies that involve applying a identifying decal or sticker on to the club and/or shaft.

A golf club is generally made of a golf club head and shaft that can be easily physically separated from each other and exchanged with other shafts or club heads. For this reason it is important that the tracking and identification technologies apply to both the specific club head and shaft combination that a customer is delivered and returns. Thus, high definition camera technology can be included and should capture at minimum a unique identifying characteristic of both the specific club head and shaft a customer is delivered and returns.

When using a sensor-based tracking and identification technology such as RFID sensor tags, a sensor needs to be placed on or in both the club head and the shaft. It is best if the sensors are of the type that becomes non-functional when they are removed from the head or shaft. This way the kiosk 7 can determine when a customer tries to return a club-shaft combination that is in anyway different from what was originally delivered to them from the kiosk 7.

A barcode sticker applied to the club and shaft can also be used in conjunction with a bar code reader to determine which club-shaft combination was delivered to the customer and returned by the customer. The bar code stickers that can be used to separately identify the club head and shaft should become no-functional if a customer tries to remove them from the club or shaft.

When a customer tries to remove a sticker or sensor or in any way tries to return a club-shaft combination other than that which was originally delivered to the customer, the system should alert the customer and then the customer will be given the opportunity to correct the situation of will be charged the purchase price for the item. Correcting the situation may involve an appeal process that would involve shipping a club to a location for inspection or some other verification process. In order to prevent such an issue from occurring, the customer should be notified at the time of club delivery that any attempts to remove the tracking & identification sensors or stickers or any attempt to return a different club-shaft combination will result in the customer's credit card being billed for the full purchase amount.

The different tracking and identification technologies that can be used dictate to some extent the internal construction and devices needed inside the kiosk. Below are listed some of the particulars that are needed for each technology: The RFID sensor and detection system should be able to determine when a product is residing in the locker or kiosk 7 as long as there are sufficient RF transmitters, detectors and antennae to do so. RF waves are impeded by metal objects, so the internal construction and materials of the kiosk 7 will dictate the number and location of the RFID transmitters, detectors, antennae and sensor labels. One possible configuration is to make the entire kiosk 7 interior RF isolated from the kiosk 7 exterior so that the kiosk 7 can determine whether the club-shaft combination resided inside the kiosk 7 or not. Using RFID technology and door position sensors the kiosk 7 can be configured to determine in real time determine when a particular locker door is opened and closed could also determine when a particular club had been removed from the kiosk inventory. A high definition camera could be located on or in the kiosk 7 so that it can take a picture to determine the condition and cleanliness of the item.

High definition camera technology can be more suitable for a kiosk configuration where a club or accessory is positioned in single location just before delivery to the customer. In this location there would be a sufficient number of cameras to capture the information about the item type and its condition.

Barcode sensor technology requires a barcode reader to scan the club or accessory just before it is delivered to the customer and then just after the customer delivers the club to the kiosk 7. The delivery and retrieval process can be a 2 step process in which the item is positioned in an area where the customer can see the item and it can be scanned by the bar code reader, then the kiosk 7 can verify the identity of the item and its match to the customer's choice, the customer can then accept delivery of the item and the kiosk 7 can register delivery. When returning the item the process can require the customer to place the item in the scanner location, which can be secured so that the customer can not immediately remove the item following scanning and identification. The kiosk 7 can then acknowledge that the proper item had been returned and accept the item. If the wrong item is returned, the kiosk 7 can then reject acceptance of the item and ask the customer to return the proper item. This same delivery/return process can also be used for high definition camera technology.

An important part of the sensor technology used on club components is that the sensors are non-removable and are permanently damaged when a customer attempts to remove the sensor.

If clubs are on a carousel inside the machine, the clubs and shafts will each need a sensor or barcode and will have to move past 2 detectors to identify the club and shaft.

The process of tracking clubs and accessories can start as early in the supply chain as the OEMs shipping location. The OEM can apply the RFID tag, bar code sticker or other technology at their shipping location in order to uniquely identify each club. The information about to uniquely identified club can then be conveyed to the receiving party. The receiving party can then use the unique identifying information to track clubs as they are shipped to any other locations before they finally reside inside a kiosk.

Thus, all items in the kiosk 7 can have installed sensors for the purpose of uniquely identifying the product and tracking the item. If the kiosk is able to assemble and disassemble items, then each part of the item can have a unique tracking and identification decal or other tamper-proof identifying technology attached to it.

The entire interactive system, consisting of three main parts 1) a website, 2) a mobile app and 3) the kiosks, provides customers with the ability to browse the available golf clubs and accessory inventory available at the kiosk(s) 7, choose or be fit to one or more clubs or accessories, select the golf club or accessories for rental and/or purchase. In addition, golfers can perform essential the same actions remote from the kiosk 7 through use of the system website and mobile phone application, query the network of kiosk 7 locations that have the selected items and then select and reserve the specific golf clubs and accessories for rental and/or purchase at a specific location.

A golfer's "profile" can keep track of a lot of information pertaining to a specific customer, such as the person's golf capabilities, payment information, club preferences, swing data, golf course data, the golf equipment and accessories they own, contact information, personal passwords for accessing the system, the person's secured credit card information, as well as the person's product rental and purchase transaction history.

Golfers can provide their individual profile information by contacting a representative and through the website, kiosk or mobile phone application and this information can be stored along with the profiles for other individual golfers in a central location so that it can be accessed by any kiosk connected to the internet. This information will be part of the golfer's "profile".

Part of the profile setup procedure can involve the system asking the consumer a series of questions to help determine how best to serve the consumer in the future.

For those golfers who have created a profile on the website, mobile app, kiosk or through customer service, and if the consumer profile includes a valid credit card, then paying for the rental and/or purchase of a golf club or accessory can be handled automatically once the person has been sufficiently identified. There are many ways that a person's ID can be certified using questions and answers to uncommon questions or through validation with a particular cell phone number, etc.

In order to initially stock, restock or change the kiosk's inventory, a service representative will physically open the kiosk and load and/or unload product inventory. This can be time consuming effort and a possible source of confusion as to which club or accessory is located in the kiosk and/or in each locker. There will be a need to know in advance 1) what product must be loaded into the kiosk and 2) the location or locker into which specific product must be loaded. Then after loading the inventory into the kiosk, there is a need to verify that the specific products have been located into the proper lockers. In certain embodiments, the clubs are labeled for head and shaft characteristics before they are put into the kiosk (this labeling can occur as early as when the clubs are received from the club manufacturers or the club manufacturers can label the heads and clubs before shipping) and that these labels which could employ various tracking technologies (discussed earlier), which will be used to track clubs until they are purchased by the consumer or returned to the kiosk. It will be advantageous for the clubs and heads to each have identifying indicia on the club and shaft so that the service rep and the kiosk 7 can easily differentiate between the club heads and shafts.

Putting ~100 clubs in the kiosk 7 for initial inventory can require a large volume of clubs to be transported to the kiosk 7. If the clubs are transported in typical 6"×5"×48", the 100 clubs will occupy a volume of approximately 4'×4'×5'. By packing clubs 2 in a box, with each positioned opposite to the other, then 2 clubs can be contained in a box and the volume is cut in half. However, the lowest volume solution to handle the inventory is to have the club heads removed from the shafts and packed in a box and the shafts could also be packed in a couple boxes (this is how clubs are typically shipped from overseas to the USA).

Less inventory is required in a kiosk 7 if the club heads and shafts are disconnected from each other and not assembled until a customer has made a request for a particular club. During the assembly process the kiosk can also adjust the shaft adapter sleeve in order to adjust the club to the proper loft and lie angles.

An important aspect of this kiosk for dispensing golf clubs and other items is that its real-time inventory can be listed on the company's website and mobile App.

The kiosk 7 can have the ability to track when personnel are in the vicinity of the kiosk 7 or at the kiosk 7 performing certain necessary tasks. This can be accomplished by having people connect to the kiosk 7 using a location service that logs time spent on the kiosk 7. The kiosk 7 will create a log showing check in and checkout, service provided, maintenance reports, club sales etc.

The flow of clubs and accessories from the original manufacturer or distributor to the kiosk 7 can be a challenge. Personnel can have 100 clubs or more in their possession. The value of these clubs is tremendous. There could be theft of the clubs between the time the Representative received the clubs and the time he places the clubs in the kiosk. The club identification technology and its ability to communicate whether a club is or is not in the kiosk will greatly help prevent theft. Everything that leaves the Representative's storage unit must be logged and scanned into the system with the specific package until the clubs are individually scanned and loaded into a kiosk 7.

When installing clubs into the kiosk 7 the process can be made more effective and efficient by pre-labeling all clubs and other items at the warehouse and associating with each club or accessory a specific kiosk 7 in which the item will installed. When at the kiosk 7, the Representative can then easily place the items in the correct lockers or in the correct location within the kiosk 7. Once the clubs and accessories have been installed in the kiosk 7, the kiosk 7 can know from the installed sensors what items then reside inside the kiosk.

By situating the kiosks at areas at golf courses and driving ranges where there is high foot traffic before the golfer becomes engaged in practicing on the range or heading out to the course, the kiosk will be a major marketing tool in itself. For the golfer who had planned to go to the golf course or driving range anyway, and who is open to the idea of possibly purchasing a new golf club or assessor, an encounter with the present invention will be a pleasant welcoming experience that is more convenient than having to make a special trip to an off-course retailer.

Many golf courses have a list of golfers that they regularly contact by email or paper mail with information or promotional messages. The revenue share with the golf courses and driving ranges will be an incentive that encourages the golf locations to advertise and encourage their customers to use the kiosk's services.

The kiosks 7 can also be used to generate revenue by selling advertising time to select parties to play their advertisements and promotional materials on the video display monitors. These promotional efforts can be complemented by selling ad space on the mobile phone app and website and/or ad space on the panels of the kiosks.

New customers are drawn to the hosting golf locations to take advantage of the added service and convenience of renting golf clubs and accessories at specific golf course and driving range locations and the owner of the golf course or driving range can share in the revenue generated by the kiosk at his golf location.

Thus, revenue can be generated from the following sources:

Golf club manufacturer's rental fees paid to include their products in the kiosk, Club & accessory rental and sales fees paid by golfers, Cross-marketing promotional programs paid for by the golf course or driving range whereby golfers or other targeted customer segments at a golf location are encouraged to patronize the golf clubhouse, golf course or driving range, Advertising revenues resulting from video advertisements displayed on video display monitors incorporated as part of the kiosk Banner ads displayed on the touch screen, video monitor, mobile phone app or system web site.

Sales of new and used golf clubs and accessories via the system website, the mobile app and kiosks Recurring revenue generated through membership-based rentals (e.g., monthly fees paid by a consumer in exchange for a fixed number of rentals over a specified period of time on a discounted basis).

Referral revenue from club fitters and golf instructors.

The kiosk represents an opportunity for the golf courses and driving ranges to share in the revenues generated by the kiosk rental and sales at their hosting location.

As noted a customer engages the system through one of the three channels—website, mobile app and kiosk. From any of the three channels, the customer has an option to either be fitted to the proper clubs or to manually shop the catalogue of clubs. If the customer chooses to be fitted for an item, then the system fits the customer to the perfect item using technology and/or an algorithm. Once the customer has chosen an item then the kiosk will prompt the customer to login to their account. If they don't have an account, then it will require them to create an account and attach a valid credit card. Once an account is created then they will be able to checkout. This can be done through any one of the channels. If a customer has reserved an item from either the mobile app or from the website then they will need to go to a kiosk to get the item (they will be required to identify themselves at the kiosk before getting the item).

A customer can be targeted online through digital advertising methods and directed to the website. Once at the website, the customer can browse a selection of clubs based on the available inventory in each kiosk within a certain geographic region. The customer can reserve or purchase a club or accessory the website and have it held at a kiosk for later pickup.

A customer who downloads the app will be able to shop the catalogue and reserve a club prior to visiting the course. This allows the customer to save time and simply pick-up the club from the kiosk upon arrival at the course. The mobile app has many of the same functions are the website. For example, the app will locate inventory based on the location of the person using the mobile app.

A customer approaches the kiosk and is engaged through a touch screen. The touch screen has a user interface that enables the customer to do many things: browse club supply, learn about different products, watch video's that describe features and benefits of different products, be fitted for a club. If the customer chooses to be custom fit then the software algorithm asks a series of questions to best determine the proper shaft, loft and brand of club. If the customer chooses to shop the catalogue then he/she will have access to any item in stock at that location. Once the customer has chosen a club then the user interface will prompt the customer to login to their account. If they don't have an account, then it will require them to create an account and attach a valid credit card. Once an account is created then they will be able to checkout. Once the card has been charged then the kiosk dispenses the item being rented.

When the customer takes the club they will be charged based on time of usage or some other measure. They are able to use the club either on the golf course or on the driving range. When they are done using the club they engage the touch screen to return the club. The screen prompts the customer if they'd either like to buy the item or if they'd like to return the item. If they choose to purchase the item then it asks whether they'd like to purchase the item in their hand or if they'd like to order a brand new club that will be fulfilled either through inventory in the kiosk or shipped directly to their door. If they choose to return the item then the transaction is finalized and the transaction is over.

If the customer has reserved the club remotely then he must re-swipe his credit card on file or enter a text messaging code in order for the kiosk to dispense the club. The customer will have a short time to inspect the club for any prior damage or issues that were not noted before they received the club, and once that time expires the rental period will begin.

OEMs can be given access to a dashboard that allows them to see their inventory and where it's located with respect to the warehouses and network of kiosks. This dashboard also allows them to edit and update marketing and educational videos. For example, they have access to change their marketing videos that will be playing on the screen above the touchscreen. Any editing or updating of videos and other material will be done over the internet through the exchange of computer files. Occasionally, OEMs will run promotional events at the kiosk in which they will be able to brand the kiosk to their liking. For example, wrapping the kiosk with their brand and promoting through other platforms. Each OEM will have a different account and will only have access to their own materials.

Club Fitters can have the ability to access the kiosk during their instructional lessons. They can have a special account that gives them access to all of the latest and greatest clubs. Each club fitter will have a different account and independent access.

The following types of individuals can interact with a kiosk 7:

Sales reps are responsible for stocking product, minor maintenance, club cleaning, and other daily activities.

Customer service reps—they speak to the customers over the phone and have to be able to communicate with the machine and the customer in real time.

Ambassadors—help people at the course understand the technology and use the kiosk.

Maintenance Personnel—maintains the kiosks in working order. Needs daily reports on usage, error messages, etc. for each kiosk. Will need to be able to remotely connect to a kiosk to do troubleshooting.

Kiosk Installation & Transport Personnel—pre-installation work to be done: cement pad, wiring, internet. Post installation will be responsible to make sure the kiosk is operational. There should probably be a diagnostic mode so that the kiosk can "self-diagnose" issues.

OEMs—want to send info (ads, videos, testimonials, etc.) to the kiosk, website and mobile app. The OEM's will need to know the location of all kiosks so that they can direct customers to a particular kiosk, They will also need specific codes that they can give to customer to have free or discounted pricing.

Accountants—kiosks should automatically send financial info to accounting team.

Golf course & Driving range employees—should have access to perform maintenance or other routine duties. Should have access to monthly revenue reports upon which their revenue share payments are based, Golf instructors—kiosk will be advertising to appropriate people. They will want to send students to the kiosk to rent & purchase equipment.

Club fitters—kiosk will advertising to appropriate people.

Warehouse and storage unit workers—either they or the OEM's install the sensors and labels on each club. They place orders with OEM's (until the kiosk can place the order itself). They are responsible for making sure the clubs with the proper sensors are moved through the system and eventually sold to a customer.

Club repair—When a club is damaged a customer will need to identify the damage at the time the club is returned. This information will then be made available to the Service Rep responsible for the particular kiosk at which the damaged club resides.

Pro Shop—they will interact with customers to answer questions, issue credits, and do other on-course customer satisfaction activities.

Figure 6:
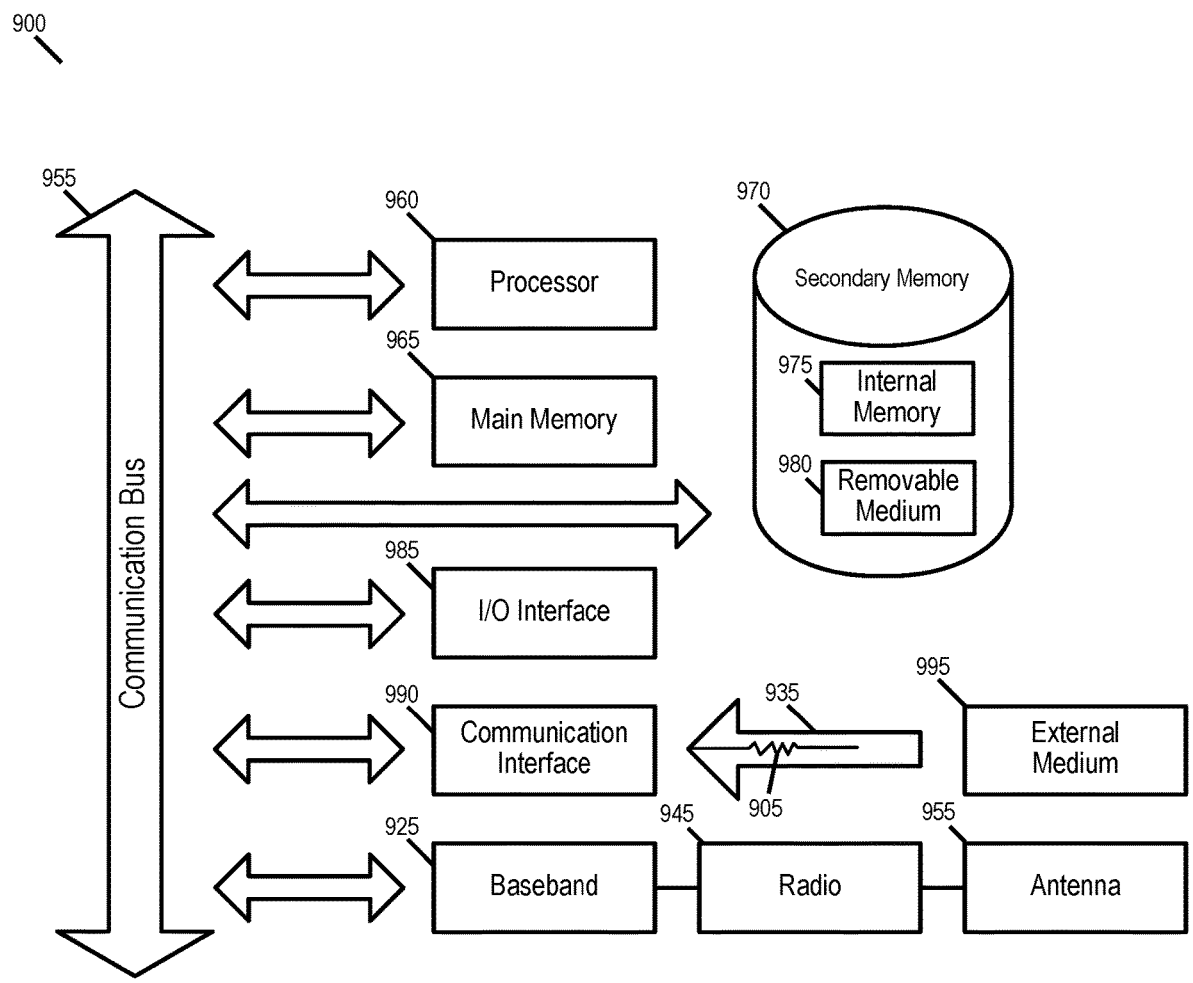
FIG. 6 is a diagram illustrating an example processing system that can be used within the system of FIG. 5.

FIG. 6 is a block diagram illustrating a wired or wireless system 900 according to various embodiments that may utilize the systems and methods described above in reference to the other Figures. For example, the system 900 could be utilized to perform the process 600 of FIG. 6. In various embodiments, the system 900 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 900 preferably includes one or more processors, such as processor 760. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 960.

The processor 960 is preferably connected to a communication bus 955. The communication bus 955 may include a data channel for facilitating information transfer between storage and other peripheral components of the system 900. The communication bus 955 further may provide a set of signals used for communication with the processor 960, including a data bus, address bus, and control bus (not shown). The communication bus 955 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The system 900 preferably includes a main memory 965 and may also include a secondary memory 970. The main memory 965 provides storage of instructions and data for programs executing on the processor 960. The main memory 965 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 970 may optionally include an internal memory 975 and/or a removable medium 980, for example a floppy disk drive, a magnetic tape drive, a compact disc ("CD") drive, a digital versatile disc ("DVD") drive, etc. The removable medium 980 is read from and/or written to in a well-known manner. Removable medium 980 may be, for example, a floppy disk, magnetic tape, CD, DVD, SD card, etc.

The removable medium 980 is a non-transitory computer readable medium having stored thereon computer executable code (i.e., software) and/or data. The computer software or data stored on the removable medium 980 is read into the system 900 for execution by the processor 960.

In alternative embodiments, secondary memory 970 may include other similar means for allowing computer programs or other data or instructions to be loaded into the system 900. Such means may include, for example, an external medium 995 and a communication interface 990. Examples of external medium 995 may include an external hard disk drive or an external optical drive, or and external magneto-optical drive.

Other examples of secondary memory 970 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are a removable medium 980 and a communication interface 990, which allow software and data to be transferred from an external medium 995 to the system 900.

The system 900 may also include an input/output ("I/O") interface 985. The I/O interface 985 facilitates input from and output to external devices. For example the I/O interface 985 may receive input from a keyboard or mouse and may provide output to a display. The I/O interface 985 is capable of facilitating input from and output to various alternative types of human interface and machine interface devices alike.

The communication interface 990 allows software and data to be transferred between system 900 and external devices (e.g. printers), networks, or information sources. For example, computer software or executable code may be transferred to system 900 from a network server via communication interface 990. Examples of communication interface 990 include, for example, but not limited to, a modem, a network interface card ("NIC"), a wireless data card, a communications port, a PCMCIA slot and card, an infrared interface, and an IEEE 1394 fire-wire.

The communication interface 990 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 990 are generally in the form of electrical communication signals 905. In one exemplary embodiment, these electrical communication signals 905 are provided to the communication interface 990 via a communication channel 935. In one embodiment, the communication channel 935 may be a wired or wireless network, or any variety of other communication links. The communication channel 935 carries the electrical communication signals 905 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 965 and/or the secondary memory 970. Computer programs can also be received via communication interface 990 and stored in the main memory 965 and/or the secondary memory 970. Such computer programs, when executed, enable the system 900 to perform the various functions of the present invention as previously described.

In this description, the term "computer readable medium" is used to refer to any non-transitory computer readable storage media used to provide computer executable code (e.g., software and computer programs) to the system 900. Examples of these media include the main memory 965, the secondary memory 970 (including the internal memory 975, the removable medium 980, and the external medium 995), and any peripheral device communicatively coupled with the communication interface 990 (including a network information server or other network device). These non-transitory computer readable mediums are means for providing executable code, programming instructions, and software to the system 900.

In one embodiment implemented using software, the software may be stored on a computer readable medium and loaded into the system 900 by way of the removable medium 980, the I/O interface 985, or the communication interface 990. In such an embodiment, the software is loaded into the system 900 in the form of electrical communication signals 905. The software, when executed by the processor 960, preferably causes the processor 960 to perform the inventive features and functions previously described herein.

The system 900 also includes optional wireless communication components that facilitate wireless communication over a voice and over a data network. The wireless communication components comprise an antenna system 955, a radio system 945 and a baseband system 925. In the system 900, radio frequency ("RF") signals are transmitted and received over the air by the antenna system 955 under the management of the radio system 945.

In one embodiment, the antenna system 955 may comprise one or more antennae and one or more multiplexors (not shown) that perform a switching function to provide the antenna system 955 with transmit and receive signal paths. In the receive path, received RF signals can be coupled from a multiplexor to a low noise amplifier (not shown) that amplifies the received RF signal and sends the amplified signal to the radio system 945.

In alternative embodiments, the radio system 645 may comprise one or more radios that are configured to communicate over various frequencies. In one embodiment, the radio system 945 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 945 to the baseband system 925.

If the received signal contains audio information, then baseband system 925 decodes the signal and converts it to an analog signal. Then the signal is amplified and sent to a speaker. The baseband system 925 may also receive analog audio signals from a microphone. These analog audio signals are converted to digital signals and encoded by the baseband system 925. The baseband system 925 also codes the digital signals for transmission and generates a baseband transmit audio signal that is routed to the modulator portion of the radio system 945. The modulator mixes the baseband transmit audio signal with an RF carrier signal generating an RF transmit signal that is routed to the antenna system 955 and may pass through a power amplifier (not shown). The power amplifier amplifies the RF transmit signal and routes it to the antenna system 955 where the signal is switched to the antenna port for transmission.

The baseband system 925 may also be communicatively coupled with the processor 960. The processor 960 has access to main memory 965 and/or secondary memory 970. The processor 960 is preferably configured to execute instructions (i.e., computer programs or software) that can be stored in the main memory 965 or the secondary memory 970. Computer programs can also be received from the baseband system 925 and stored in the main memory 965 or in secondary memory 970, or executed upon receipt. Such computer programs, when executed, enable the system 900 to perform the various functions of the present invention as previously described. For example, the main memory 965 may include various software modules (not shown) that are executable by processor 960. The accompanying claims and their equivalents are intended to cover such forms or modifications as would fall within the scope and spirit of the protection. For example, the example apparatuses, methods, and systems disclosed herein can be applied to wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. An equipment rental and purchase system comprising:
 a kiosk, the kiosk comprising a user interface configured to receive user input and provide outputs to a user,
 a processor configured to receive the user input from the user interface, generate user output and control a locker system; and
 a locker system for storing a plurality of pieces of golf equipment, the locker system comprising:
  a plurality of discrete positions each configured to store at least one piece of golf equipment and allow access to the plurality of golf equipment under control of the processor,
  each of the plurality of discrete locations is a locker, at least two or more of the lockers having a non-uniform shape adapted to store golf clubs, the non-uniform shape comprising a first part, from which the golf club is accessible, connected to a tubular second part, the first part having a width larger than a diameter of the tubular second part, wherein the first part is adapted to receive a head of the one golf club and the tubular second part is adapted to receive a shaft of the one golf club,
 the processor configured to:
  receive log in and credential information from a user via the user interface,
  present the user a choice of golf equipment from the plurality of pieces of golf equipment, receive a selection of one or more pieces of golf equipment through the user interface, wherein the selection of one or more pieces of golf equipment corresponds to one or more discrete positions of the plurality of discrete positions,
  gather payment information from the user through the user interface, wherein the payment information corresponds to a period of use for the selected one or more pieces of golf equipment, control the locker system to allow access to the corresponding one or more discrete positions to make the selected one or more pieces of golf equipment available to the user, receive a user selection to return at least one of the accessed one or more pieces of golf equipment, and, based on said selection to return, verify that the returned pieces of golf equipment matches one of the accessed one or more pieces of golf equipment and control the locker system to receive the returned pieces of golf equipment, and receive a user selection to provide a piece of golf equipment owned by the user, separate from the plurality of pieces of golf equipment, to the equipment rental and purchase system, and, based on said selection to provide the piece of golf equipment owned by the user, control the locker system to receive the piece of golf equipment from the user for storage and provide a credit to the user based on the received golf equipment, wherein the credit is toward controlling the locker system to allow access to the corresponding one or more discrete positions to make the selected one or more pieces of golf equipment available to the user.

2. The equipment rental and purchase system of claim 1, wherein the processor is further configured to verify the period of use has not been exceeded.

3. The equipment rental and purchase system of claim 2, wherein the processor is further configured to process additional payment when the period of use has been exceeded, based on the gathered payment information.

4. The equipment rental and purchase system of claim 2, wherein the processor is further configured to process additional payment for the purchase of the equipment.

5. The equipment rental and purchase system of claim 2, wherein the processor is further configured to provide a return receipt when the equipment is successfully returned.

6. The equipment rental and purchase system of claim 1, wherein the locker system comprises a plurality lockers and a plurality of locked doors, each locker and locked door corresponding to a discrete position, wherein controlling the locker system to allow access to the corresponding one or more discrete positions comprises unlocking the corresponding locked doors to allow access to the one or more pieces of golf equipment stored in the corresponding lockers.

7. The equipment rental and purchase system of claim 6, wherein controlling the locker system comprises opening the corresponding locked doors to provide access to the one or more pieces of golf equipment stored in the corresponding lockers.

8. The equipment rental and purchase system of claim 1, wherein the locker system comprises a locked door and a carousel system comprising the plurality of discrete positions, wherein controlling the locker system comprises moving the plurality of discrete positions of the carousel system to align the corresponding one or more discrete positions with the locked door and unlocking the locked door to allow access to the one or more pieces of golf equipment stored at the corresponding one or more discrete positions.

9. The equipment rental and purchase system of claim 8, wherein controlling the locker system comprises opening the locked door to provide access to the one or more pieces of golf equipment.

10. The equipment rental and purchase system of claim 1, wherein the returned the at least one of the accessed one or more pieces of golf equipment comprises at least one of an old piece of golf equipment, a used piece of golf equipment, a previously accessed piece of golf equipment, and a previously purchased piece of golf equipment.

11. The equipment rental and purchase system of claim 1, wherein the gathered payment information comprises the credit.

12. The equipment rental and purchase system of claim 1, wherein the kiosk comprises one or more sensors configured to identify and determine a condition of one or more of the pieces of golf equipment, wherein the processor is configured to, upon receiving the piece of golf equipment from the user, identify the received piece of golf equipment and determine the condition of the received piece of golf equipment based on the one or more sensors, wherein the credit is based in part on the identification and determined condition.

13. The equipment rental and purchase system of claim 1, wherein the processor is further configured to:

identify the received piece of golf equipment based, in part, on a user input identifying the piece of golf equipment through the user interface, wherein the credit or funds is based in part on the identification of the piece of golf equipment.

14. The equipment rental and purchase system of claim 1, wherein the processor is further configured to:

track when each of the selected one or more pieces of golf equipment is removed from the locker system based, in part, on one or more tracking devices, and track when each of the one or more pieces of golf equipment is returned to the locker system based, in part, on the one or more tracking devices.

15. The equipment rental and purchase system of claim 14, wherein the one or more tracking devices comprises one or more of a sensor based identification technology, barcode based identification technology, camera based visual recognition system, and a combination thereof.

16. The equipment rental and purchase system of claim 15, wherein the sensor based identification technology comprises one or more sensors attached to each of the pieces of golf equipment configured to be detected by the equipment rental and purchase system.

17. The equipment rental and purchase system of claim 16, wherein the one or more sensors comprises at least one radio frequency identification (RFID) tag.

18. The equipment rental system of claim 1, wherein each of the one or more pieces of golf equipment are golf clubs each comprising a head part and a shaft part, each of the head part and the shaft part comprising a sensor, wherein verifying that the returned piece of golf equipment matches one of the accessed one or more pieces of golf equipment comprises determining that the head part and the shaft part are associated with each other based on outputs received from the sensors.

19. The equipment rental system of claim 1, further comprising a computing device associated with the user communicatively coupled to the kiosk via a network, the computing device comprises an application running thereon configured to receive user inputs and provide the user inputs to the kiosk over the network, wherein one or more of the user inputs received by the kiosk are provided by the application.

20. The equipment rental system of claim 1, wherein payment information is based on a number of times the selected one or more pieces of golf equipment have been demoed by users of the equipment rental and purchase system.

21. An equipment rental and purchase system comprising:
a kiosk comprising a user interface configured to receive user input and provide outputs to a user, one or more sensors configured generate outputs, and a processor configured to receive the user input from the user interface, generate user output and control a locker system;
the locker system comprising:
   a plurality of discrete positions each configured to store at least one golf equipment and allow access to the golf equipment under control of the processor,
   each of the plurality of discrete locations is a locker, at least two or more of the lockers having a non-uniform shape adapted to store golf clubs, the non-uniform shape comprising a first part, from which the golf club is accessible, connected to a tubular second part, the first part having a width larger than a diameter of the tubular second part, wherein the first part is adapted to receive a head of the one golf club and the tubular second part is adapted to receive a shaft of the one golf club,
the processor configured to:
   receive log in and credential information from a user via the user interface,
   present the user a choice of golf equipment from the golf pieces of golf equipment, receive a selection of one or more pieces of golf equipment through the user interface, wherein the selection of one or more pieces of golf equipment corresponds to one or more discrete positions of the plurality of discrete positions,
   control the locker system to allow access to the corresponding one or more discrete positions to make the selected one or more pieces of golf equipment available to the user, and
   upon receiving the one or more pieces of golf equipment being returned by the user, identify the received one or more pieces of golf equipment and determine the condition of at least one of the received one or more pieces of golf equipment based on the output from the one or more sensors, wherein at least the one or more pieces of golf equipment is a golf club comprising a head part and a shaft part, each of the head part and the shaft part comprising an identifying sensor, wherein identifying the received one or more golf clubs comprises determining that head part and shaft part are associated with each other based on outputs from the identifying sensors.

22. The equipment rental system of claim 21, wherein the one or more sensors comprises a camera configured to generate an image of the at least one of the received one or more pieces of golf equipment, wherein the processor is configured to compare the generated image against a previous image of the at least one of the received one or more pieces of golf equipment to determine the condition.

23. The equipment rental system of claim 21, further comprising a computing device associated with the user communicatively coupled to the kiosk via a network, the computing device comprises an application running thereon configured to receive user inputs and provide the user inputs to the kiosk over the network, wherein one or more of the user inputs received by the kiosk are provided by the application.

* * * * *